US008407696B2

(12) United States Patent
Alpern et al.

(10) Patent No.: US 8,407,696 B2
(45) Date of Patent: Mar. 26, 2013

(54) METHOD FOR DELIVERING, TESTING, AND APPLYING SOFTWARE PATCHES OR OTHER CHANGES TO A CONVENTIONALLY INSTALLED APPLICATION IN VIRTUAL APPLICATION CONTAINERS

(75) Inventors: Bowen Alpern, Peekskill, NY (US); Glenn S Ammons, Albany, NY (US); Vasanth Bala, Rye, NY (US); Todd W Mummert, Danbury, CT (US); Balachandar Rajaraman, Cary, NC (US); Darrell Christopher Reimer, Tarrytown, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 11/757,954

(22) Filed: Jun. 4, 2007

(65) Prior Publication Data

US 2008/0301676 A1 Dec. 4, 2008

(51) Int. Cl.
*G06F 9/455* (2006.01)
*G06F 9/44* (2006.01)
*G06F 9/445* (2006.01)
*G06F 12/16* (2006.01)
*G06F 7/04* (2006.01)

(52) U.S. Cl. .............. 718/1; 717/168; 717/174; 726/22; 726/26

(58) Field of Classification Search .................. None
See application file for complete search history.

(56) References Cited

U.S. PATENT DOCUMENTS

| 6,584,118 | B1 | 6/2003 | Russell | |
|---|---|---|---|---|
| 6,704,326 | B2 | 3/2004 | Russell | |
| 6,802,054 | B2 | 10/2004 | Faraj | |
| 7,062,567 | B2 | 6/2006 | Benitez | |
| 7,356,679 | B1 * | 4/2008 | Le et al. | 713/1 |
| 7,577,722 | B1 * | 8/2009 | Khandekar et al. | 709/220 |
| 7,865,893 | B1 * | 1/2011 | Omelyanchuk et al. | 718/1 |
| 7,913,226 | B2 * | 3/2011 | Lowell et al. | 717/120 |
| 7,941,813 | B1 * | 5/2011 | Protassov et al. | 719/321 |
| 2004/0174902 | A1 | 9/2004 | Russell | |
| 2005/0210467 | A1 * | 9/2005 | Zimmer et al. | 718/1 |
| 2005/0262042 | A1 | 11/2005 | Kondo | |

(Continued)

OTHER PUBLICATIONS

Gladney, HM, et al., "Trustworthy 100-Year Digital Objects: Durable Encoding for When It's Too Late to Ask," ACM Digital Library, 2005.

(Continued)

*Primary Examiner* — Emerson Puente
*Assistant Examiner* — Adam Lee
(74) *Attorney, Agent, or Firm* — Michael J. Buchenhorner; Anne Dougherty

(57) ABSTRACT

A method for updating an application on a host system includes steps or acts of: installing an application on the host system; installing a virtual machine monitor on the host system, installing a first virtual container on the host system, wherein the first virtual container comprises at least one update to the installed application; and instantiating the first virtual container under the virtual machine monitor in a mode wherein the host system can be accessed but not modified and wherein instantiating the first virtual container includes updating the installed application in the first virtual computer and running the updated application in the first virtual container. The method may also include a step of confirming that the updated application runs properly. Optionally, the virtual container may be devirtualized.

17 Claims, 8 Drawing Sheets

U.S. PATENT DOCUMENTS

| | | | |
|---|---|---|---|
| 2006/0021029 A1* | 1/2006 | Brickell et al. | 726/22 |
| 2006/0184935 A1* | 8/2006 | Abels et al. | 718/1 |
| 2006/0224930 A1* | 10/2006 | Bantz et al. | 714/48 |
| 2006/0288168 A1* | 12/2006 | Stevenson | 711/115 |
| 2007/0050765 A1* | 3/2007 | Geisinger | 718/1 |
| 2007/0089111 A1* | 4/2007 | Robinson et al. | 718/1 |
| 2007/0106993 A1* | 5/2007 | Largman et al. | 718/104 |
| 2007/0244987 A1* | 10/2007 | Pedersen et al. | 709/217 |
| 2007/0271561 A1* | 11/2007 | Winner et al. | 718/1 |
| 2008/0098391 A1* | 4/2008 | Medvedev et al. | 718/1 |
| 2008/0104588 A1* | 5/2008 | Barber et al. | 718/1 |
| 2008/0244598 A1* | 10/2008 | Tolopka et al. | 718/104 |
| 2008/0295064 A1* | 11/2008 | Mitra et al. | 717/100 |

OTHER PUBLICATIONS

Smaragdakis, Y., et al., "Mixin Layers: An Object-Oriented Implementation Technique for Refinements and Collaboration-Based Designs," ACM Digital Library, 2002.

Dimitriev, M, "Safe Class and Data Evolution in Large and Long-Lived Java Applications," ACM Digital Library, 2001.

* cited by examiner

100

200

METHOD FOR DELIVERING, TESTING, AND APPLYING SOFTWARE PATCHES OR OTHER CHANGES TO A CONVENTIONALLY INSTALLED APPLICATION IN VIRTUAL APPLICATION CONTAINERS

STATEMENT REGARDING FEDERALLY SPONSORED-RESEARCH OR DEVELOPMENT

This invention was made with Government support under Contract No.: NBCH 3039004 awarded by the Defense Advanced Research Projects Agency (DARPA). The United States Government has certain rights in this invention.

CROSS-REFERENCE TO RELATED APPLICATIONS

None.

INCORPORATION BY REFERENCE OF MATERIAL SUBMITTED ON A COMPACT DISC

Not Applicable.

FIELD OF THE INVENTION

The invention disclosed broadly relates to the field of software updates and more particularly relates to the field of applying software updates in a virtual container.

BACKGROUND OF THE INVENTION

Virtualization technology has been gaining widespread commercial acceptance in recent years. Server virtualization allows multiple operating system (OS) stacks to share common hardware resources such as memory and CPU—it is generally implemented as a mediation layer that operates between the OS and the hardware. Application level virtualization technologies allow multiple application stacks to share a common OS namespace such as files and registry entries. It is generally implemented as a mediation layer that operates between the application processes and the OS.

With server virtualization, an OS stack can be given the illusion that its required hardware resources are available exclusively for its use, whereas in reality the hardware resources may be shared by multiple OS stacks. With application virtualization, an application can be given the illusion that its files and registry entries are exactly where it expects them to be on the host machine, whereas in reality multiple application install images may be sharing those same locations in the namespace.

The two kinds of virtualization technology (server virtualization and application virtualization) operate at different levels of the stack, and their value propositions are complimentary. Server virtualization enables encapsulation of the states of a complete OS+application software stack within a virtual server container, while application virtualization enables encapsulation of the state of an application stack only within a virtual application container. Both allow their respective containers to be deployed and managed as an appliance, ie., a pre-installed and pre-tested environment within a secure sandbox that is isolated from other stacks that share the same environment. This has significant commercial value from an IT management standpoint, because appliances provide greater robustness and security assurances than conventional install-based methods of deployment.

Current practice for patching conventionally installed software is painful for system administrators who must apply the patch, test it and, potentially, roll back the changes. Preparation for potential rollback is particularly burdensome. Often multiple patches are available to be applied to the application with conflicting dependencies among the patches. Ideally, a system administrator might test several combinations of patches before settling on a suite to apply.

Referring to FIG. 1, there is shown the state of the art for applying patches to software applications by naïve users. First, the patch is applied to the application 1010. Then, the application is run in production mode 1020. There are problems with this approach: the patched application may not run, it may run and exhibit incorrect behavior, it may run and exhibit poor performance, and/or it may run and break other applications. While some of these failure modes may manifest immediately, some may not become apparent until after the patched application has been run for a considerable period of time. Recovering from such failures is seldom easy or painless.

The state of the art for applying patches by more sophisticated users and systems administrators is depicted in FIG. 3. Before the application is patched in step 3020, the local state of the system is captured and saved in step 3010. The patched application is first run in a testing mode 3030. A decision is subsequently made as to whether the patched application is behaving acceptably 3040. If so, the patched application is run in production mode 3050. If not, the patched application is discarded 3060, the saved state is restored 3070, and the previous, unpatched, application is again run in production mode 3080 (rolled back). One skilled in the art will understand that, in testing mode, the input to the patched application will be structured so as to stress the various capabilities of the application without having significant effects that reach beyond the local state of the system that cannot easily be rolled back as part of the restoration step 3070.

Virtual Environment Background.

A virtual execution environment enables an asset's install-time environment to be reproduced virtually while otherwise not isolating the asset from peer applications on a target machine. A framework is provided for intercepting interfaces above the operating system (e.g., Java class loading), enabling optimizations requiring semantic awareness not present at the OS level. The virtual environment provides isolation from the uncontrolled variability of target machines, particularly from potentially conflicting versions of prerequisite software. Skilled personnel assemble a self-contained software universe (potentially including the operating system) with all of the dependencies of an application, or suite of applications, correctly resolved. They then have confidence that this software will exhibit the same behavior on every machine, since a virtual machine monitor (VMM) will be interposed between it and the real machine.

Consider a scenario in which several different applications produced by separate organizations need to be integrated on the same machine. Virtual machine monitors can help tame such conflicts by allowing each application's dependencies to be embedded in its private VM image. Assets (applications) are isolated from each other in the sense that each one sees its own unique resources—virtual files, directories, and system metadata—and not resources that are unique to some other asset. While assets cannot see any of the host machine's resources that were overlaid by their own virtual ones, they can see other local resources and can communicate with other programs running on the host machine through non-occluded portions of the local file system and local interprocessor communication (IPC).

Without an effective mechanism for reducing redundancy between (as well as within) assets, the proliferation of virtual views would entail a prohibitive amount of space to store, and bandwidth to transport, many closely related assets (the "code bloat" problem). To address this difficulty, assets are partitioned into shards, variable-sized semantically determined "pages" that are the unit of transfer between a software repository and the host machine. Shards may correspond to files, semantically cogent portions of files, system metadata such as registry entries, or metadata used by the virtual machine monitor. Shards are freely shared across assets. Bitwise identical shards are given the same physical name (in shard storage) and are only stored once. FIG. 9 depicts a physical view versus a virtual view of software deployment. A reference to C from asset X.1 is mapped to a different shard (shown as shard C.1) than a reference to C from asset X.2 (shown as shard C.2) while references to A in either asset are mapped to the same shard.

Shards help maintain an appropriately scaled working set as the repertoire of assets in use on a machine evolves over time. Most significantly, since they are semantically determined, they allow redundant parts of highly similar assets to be detected and shared transparently (while maintaining the illusion that each asset has its own copy). Thus, the duplication implied by the virtual view of an asset's evolution is not reflected in its physical storage manifestation.

SUMMARY OF THE INVENTION

Briefly, according to an embodiment of the invention a method for updating an application on a host system includes steps or acts of: installing an application on the host system; installing a virtual machine monitor on the host system, installing a first virtual container on the host system, wherein the first virtual container comprises at least one update to the application; and instantiating the first virtual container within the virtual machine monitor in a mode wherein the host system can be accessed but not modified and wherein instantiating the first virtual container includes applying, in the first virtual container, the update to the application and running the updated application in the first virtual container. The method may also include a step of confirming that the updated application runs properly. Optionally, the virtual container may be devirtualized.

According to another embodiment of the present invention, a method for devirtualizing a virtual container includes steps of: copying a state of the virtual container into a host machine, or designated portion thereof, setting system and user environment variables on the host machine; examining files in the host system, or designated portion thereof, and the virtual application container; deleting the files that exist in the host system, or designated portion thereof, but not in the virtual application container; deleting files of the host system, or designated portion thereof, that have different contents from the files in the virtual container; copying files from the virtual container that do not exist in the host system, or designated portion thereof, to a file system of the host system. This may include copying keys into a Windows registry. The virtual container and the virtual machine monitor may then be discarded from the system.

A system updating an application on a host system includes: at least one virtual machine monitor, at least one virtual container; at least one application; at least one update to the application; and a processor configured for carrying out the above method steps. The system may also include an input multiplexer configured for mediating access to the at least one virtual container; and an output analyzer configured for confirming that the updated application performed as expected.

According to another embodiment of the present invention a computer program product embodied on a computer readable medium includes code that, when executed, causes a computer to perform the above method steps for updating an application in a host system.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
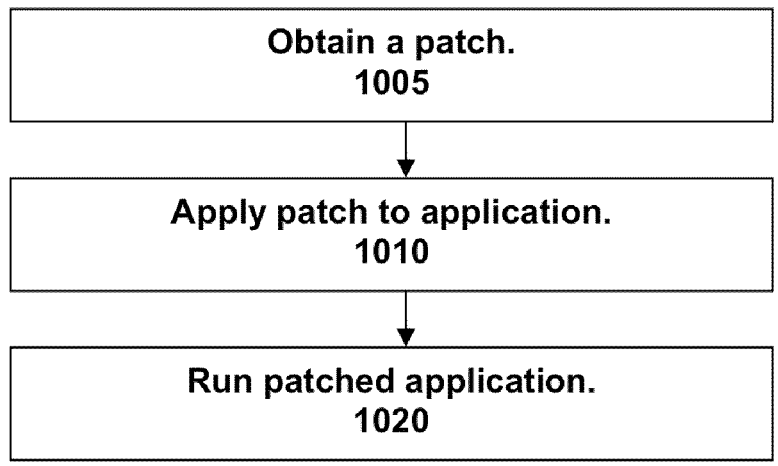
FIG. 1 is a flowchart of a method for applying patches, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system and method using virtualization technology to update applications. In particular, we provide a new technique for testing and applying patches (or other updates) to conventionally installed applications. We deliver software patches in virtual containers. One or more patches (or other changes to existing software) are delivered in the virtual container. The virtual container may be a virtual application container or a virtual system container.

The patches are tested before they are applied to the host computer. When some or all of the updated patches in the virtual container are applied (still within the virtual container), the virtual container contains the effects of applying the patch updates to a previously installed application (either conventionally installed on the host system or within another virtual container). When testing reveals the effect of the updates to be acceptable, the state of the host system is transformed to match that of the virtual container instance containing the installed updates.

According to an embodiment of the present invention an asset is installed conventionally on a host machine. An update (patch), or other code modification, is delivered in a virtual container. A virtual machine monitor on the host system runs this container in a mode wherein the host environment can be accessed (read) but not modified (written). When code in the container attempts to modify the host environment a copy-on-write mechanism (known to those with knowledge in the art) is used to create the illusion within the container that the modification has taken place without contaminating the host environment.

The patch is applied in the container resulting in a virtual container with the patched application that can be tested without affecting the environment on the host machine. Rollback can be achieved by simply discarding this instance of the container. Other mechanisms may be needed to prevent interactions with databases and other machines during testing from escaping containment. In some cases, the original and patched applications could be run in tandem with input replicated between the two instances and the output compared.

When the system administrator is satisfied with the behavior of the patched application, the effects of the patch can be "devirtualized" into the host machine's environment. Devirtualization causes the host machine environment to be transformed to reflect the state of the virtual container.

Several techniques may be used to test combinations of patches. A virtual container could be built to contain multiple patches, and a system administrator could create multiple instances of the container with different combinations applied in each. Or, different combinations of patches could be built into different virtual containers. Or, each container could possess a single patch, and the effect of applying two patches would be achieved by running one container inside another.

According to an embodiment of the present invention, a working application is developed, installed and put into production. Any updates to the application are made and captured as a virtualized overlay. The changes or updates (the virtualized overlay) are then tested in a virtual container running instead of (or in tandem with) the production version. When the behavior of the modified application is deemed acceptable, the contents of the container are devirtualized onto the production machine.

Figure 2:
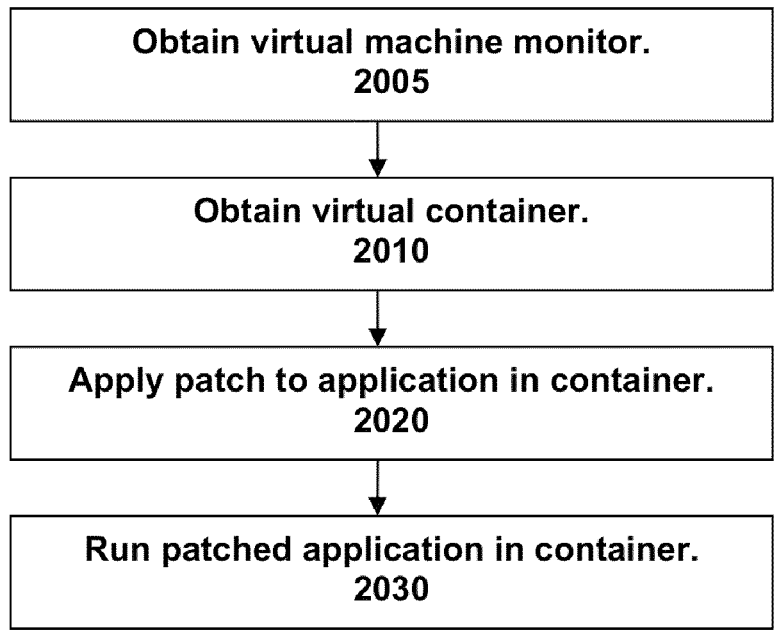
FIG. 2 is a flow chart of a method of patch testing in a virtual container, according to an embodiment of the invention.

Referring to FIG. 2 there is shown an embodiment of the present invention as it might be used by naïve users. First a virtual machine monitor (VMM) is obtained and installed on the host system 2005. Then a virtual container is obtained 2010 containing a patch to an application previously installed on the host computer. This container is configured to allow some or all of the state of the host machine to appear within the container, and to allow changes to be made to this state within the container, but to prevent such changes from affecting the state of the host machine (except such parts of the host machine used by the virtual machine monitor to support the execution of the container). The patch is then applied to the application in the container 220. The container now has the patched application while the unpatched application remains intact on the host.

The patched application is then run in production mode from within the virtual container 2030. This solution is subject to the same failure modes as the process depicted in FIG. 1 (except that execution of the patched application in its container will not break other applications running on the host). However, full or partial recovery can be achieved by merely removing the container and restarting the unpatched application. One skilled in the art will readily see how to package steps 2005, 2010, 2020, and 2030 so that the user will only need to indicate the application and the patch in order to run the patched application in a virtual container. The virtual container may be a virtual application container or a virtual system container.

Figure 4:
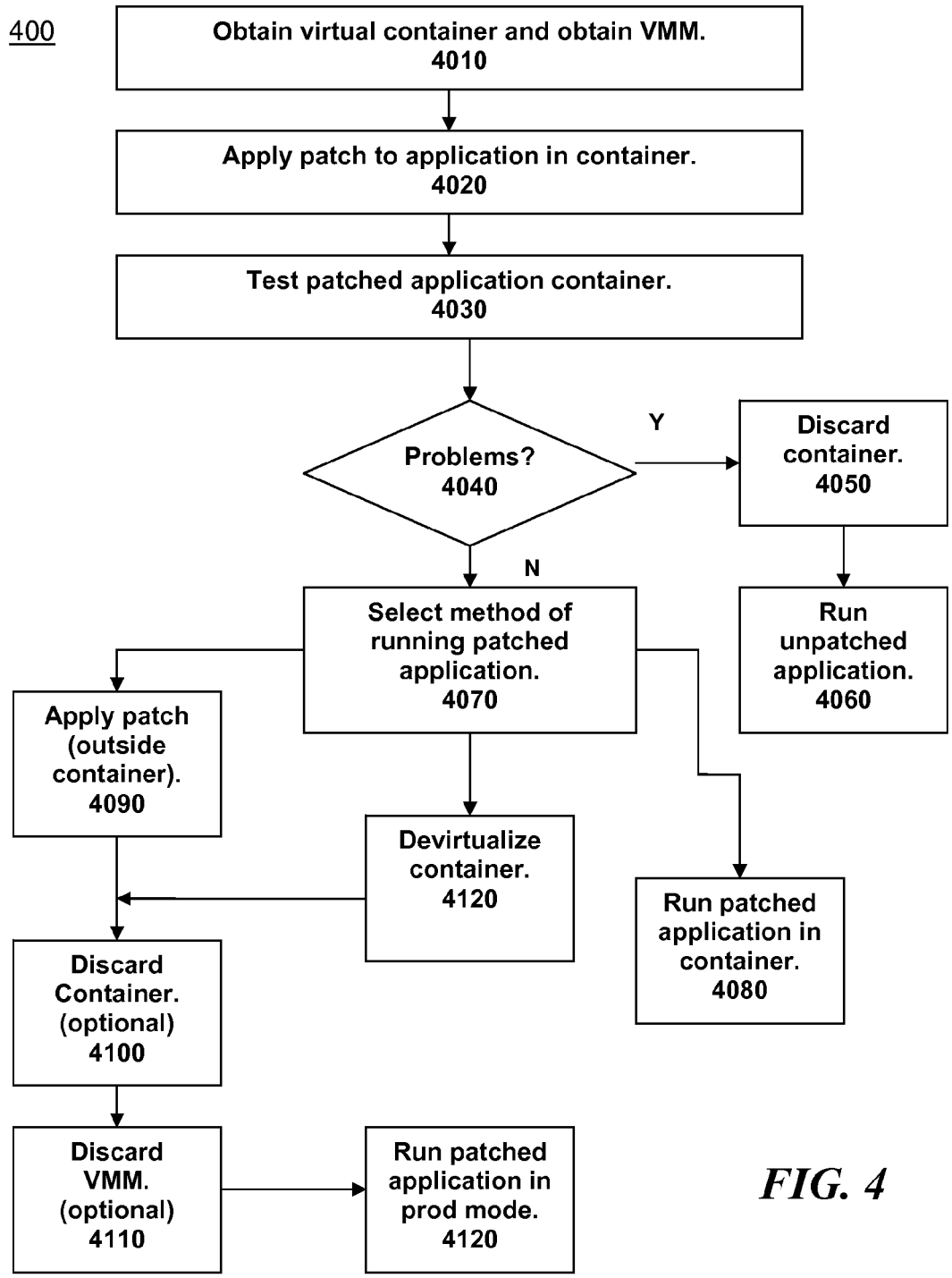
FIG. 4 is a flow chart of a method according to an embodiment of the present invention.

FIG. 4 shows how an embodiment of the invention might be used by a more sophisticated user such as a system administrator. Step 4010 is the same as steps 2005 and 2010 from FIG. 2. Likewise, step 4020 is the same as step 2020 from FIG. 2. Step 4030 differs from step 2030 only in that the application runs in testing mode rather than in production mode.

After the patched application has been tested, a decision is made as to whether the patched application is behaving acceptably 4040. If any problems were encountered, the container is discarded 4050, and the unpatched application restarted in production mode on the host 4060.

Otherwise, if the patch test was successful, a selection 4070 must be made as to whether to: 1) run the patched application in production mode in the container 4080; or 2) apply the patch on the host machine 4090, optionally discard the container 4100, optionally discard the virtual machine monitor 4110, and run the patched application on the host machine in production mode 4120; or 3) devirtualize the container 4130, optionally discard the container 4100, optionally discard the virtual machine monitor 4110, and run the patched application in production mode on the host machine 4120. One with knowledge in the art will also see that other methods resolving conflicts between the state of the host and that of the container could also be used within the spirit and scope of the invention.

Figure 5:
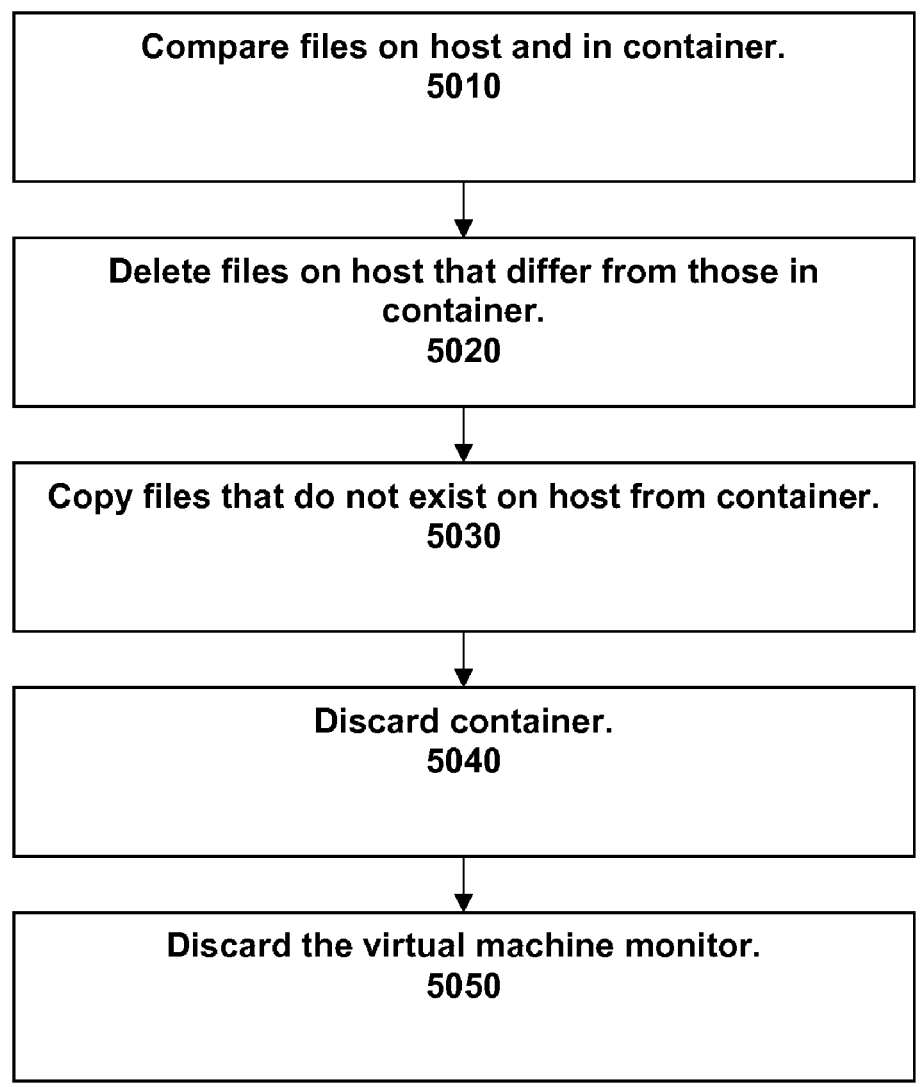
FIG. 5 is a flow chart of the method of devirtualization, according to an embodiment of the present invention.

FIG. 5 depicts the process of devirtualization. First, files having different contents on the host, or a designated portion thereof, than in the container and files existing on the host, or designated portion thereof, but not in the container are deleted from the host, or designated portion thereof in step 5010. Then, files that do not exist on the host, or designated portion thereof, but do exist in the container, are copied from the container to the host, or designated portion thereof in step 5020.

The files moved to the host from the virtual container are either: created in the virtual container or moved from the host, or designated portion thereof, and then modified (copy on write) when the patch was applied, or created in the virtual container or moved from the host, or designated portion thereof, and then modified (copy on write) while the patched application was being tested in the virtual container. One with knowledge in the art will understand how the operations on "files" in 5010 and 5020 could be performed on "Windows Registry Keys," or "environment variables," or any other units of state. This step may involve copying keys into a Windows registry (possibly overwriting the values of previously existing keys). These keys may originate from: application of the patch in the virtual container, modification of keys on the host system (copied on write into the virtual container) during patch application, or execution of the patch in the virtual container during testing either by direct key creation or by modification of the values of keys on the host machine, or designated portion thereof, (causing the modified values to be instantiated in the container by the virtual machine monitor's copy on write mechanism).

Figure 3:
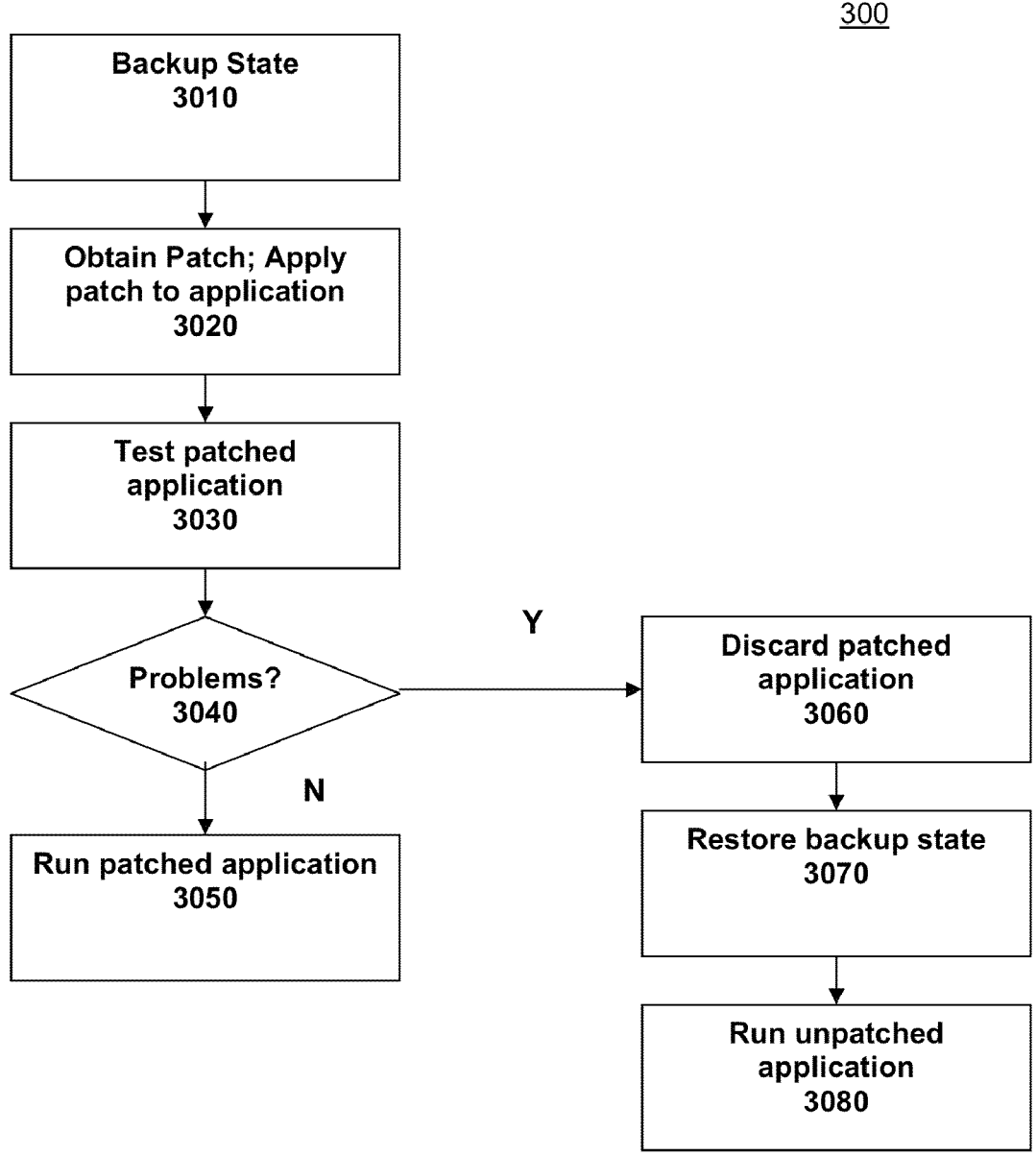
FIG. 3 is a flow chart of a method of patch testing, according to the known art.

Optionally, the container may be discarded in step 5030. Optionally, the virtual machine monitor may be removed from the host 5040, leaving the host in a state as if it had been conventionally patched as in FIG. 1 or 3.

Figure 6:
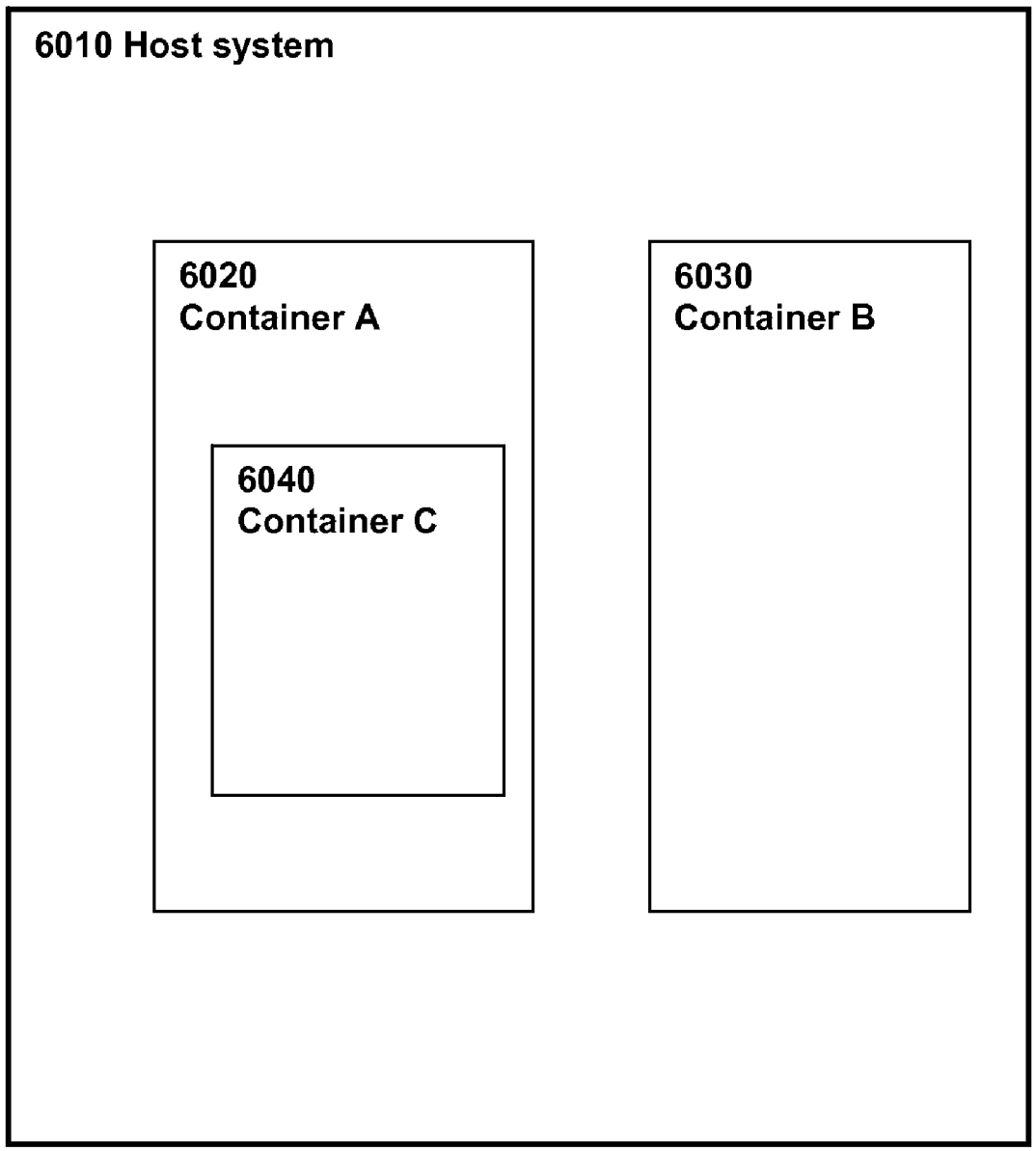
FIG. 6 depicts the nesting of virtual containers, according to an embodiment of the present invention.

FIG. 6 depicts the nesting of virtual containers. Techniques for running one virtual container within another date back to the IBM System 370 in the 1970's. The host computer is depicted as a box 6010. Two virtual containers are depicted as boxes 6020 and 6030 within the box representing the host computer 6010. Another virtual container 6040 is depicted as a box within the box 6020 representing one of the other virtual containers. One with knowledge in the art will see how multiple virtual containers can execute simultaneously and immediately on the same host machine. One with knowledge in the art will also see how one virtual machine can execute within another and how the levels of nesting need not have any fixed bound.

Figure 7:
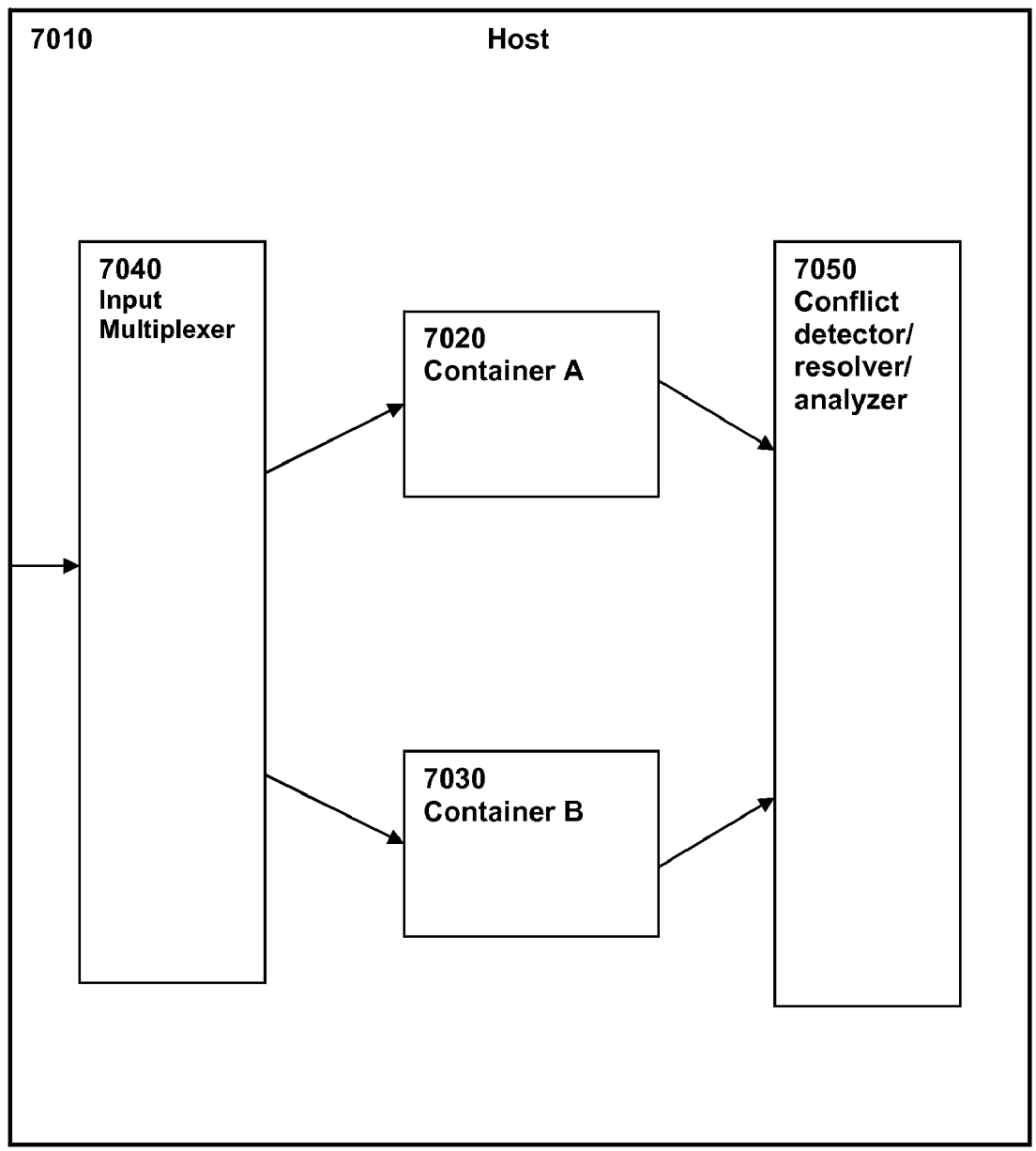
FIG. 7 is a simplified block diagram of tandem virtual containers in a host system, according to an embodiment of the present invention.

FIG. 7 depicts two virtual containers running in tandem. The host computer 7010 contains two containers 7020 and 7030. Access to the containers is intermediated by a mechanism 7040 that multiplexes input to each. Output from, and/or performance of, the containers is monitored by another mechanism 7050. One with knowledge in the art will recognize how this arrangement can be used to determine that a patched application has the same behavior and/or performance as the unpatched application or that its behavior and/or performance differ in an expected way. It may be desirable to run two or more virtual containers with updated applications, possibly including one containing a "vanilla" update (an update which does not modify the application). One with knowledge in the art will understand that three or more containers could be similarly managed by mechanisms like those depicted in 7040 and 7050. One with knowledge in the art will see that two or more containers could be spread over two or more computers in networked configuration. One versed in the art will understand that one or more host computers could be used instead of one or more of the containers.

The method according to embodiments of the present invention can be performed on a fee basis for clients. Updates and test runs would need to be logged for billing purposes. Alternatively, a client may select to have access to the services by paying a monthly subscription fee.

Figure 8:
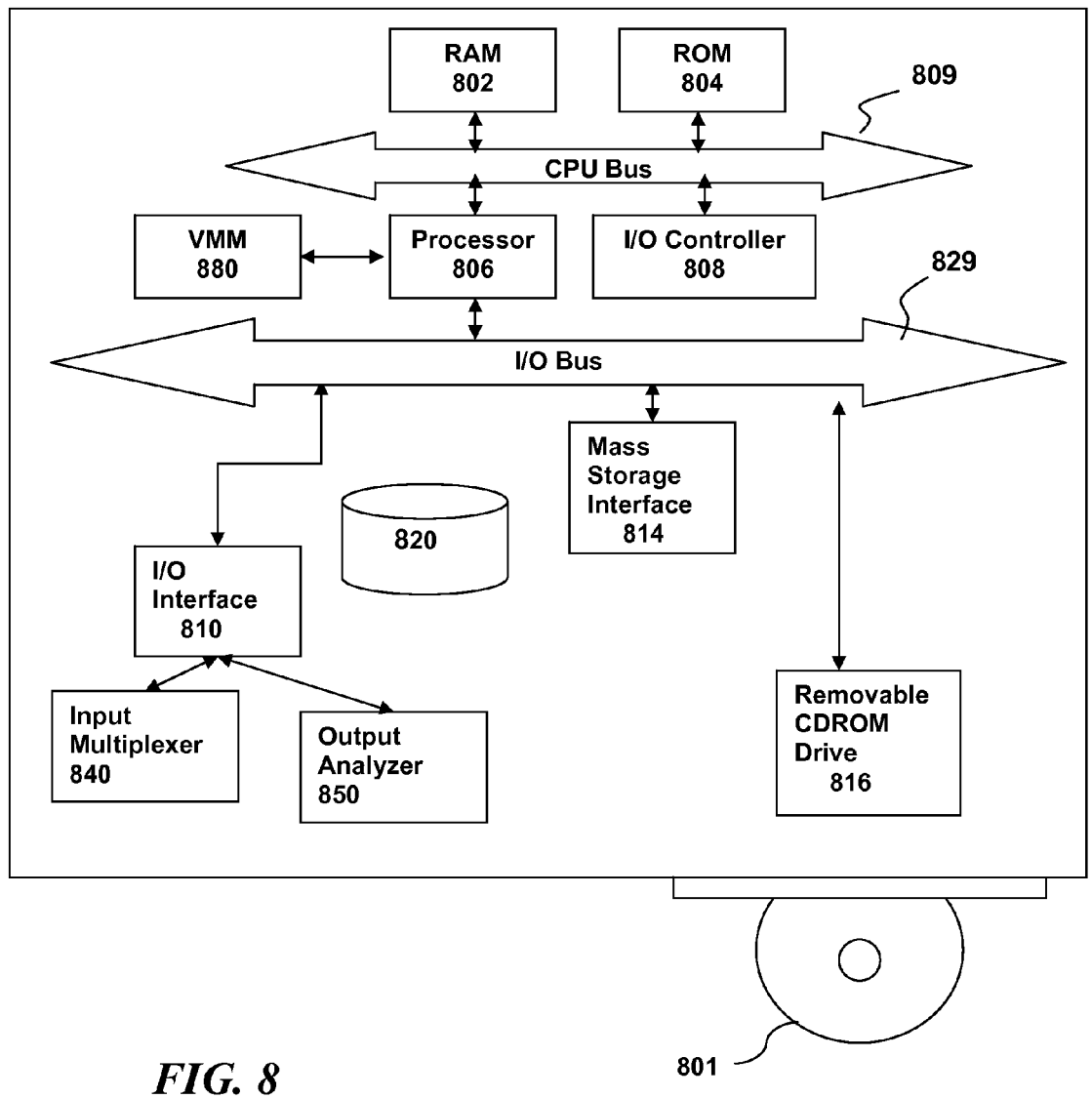
FIG. 8 is a simplified block diagram of a host system configured to operate according to an embodiment of the present invention.
Figure 9:
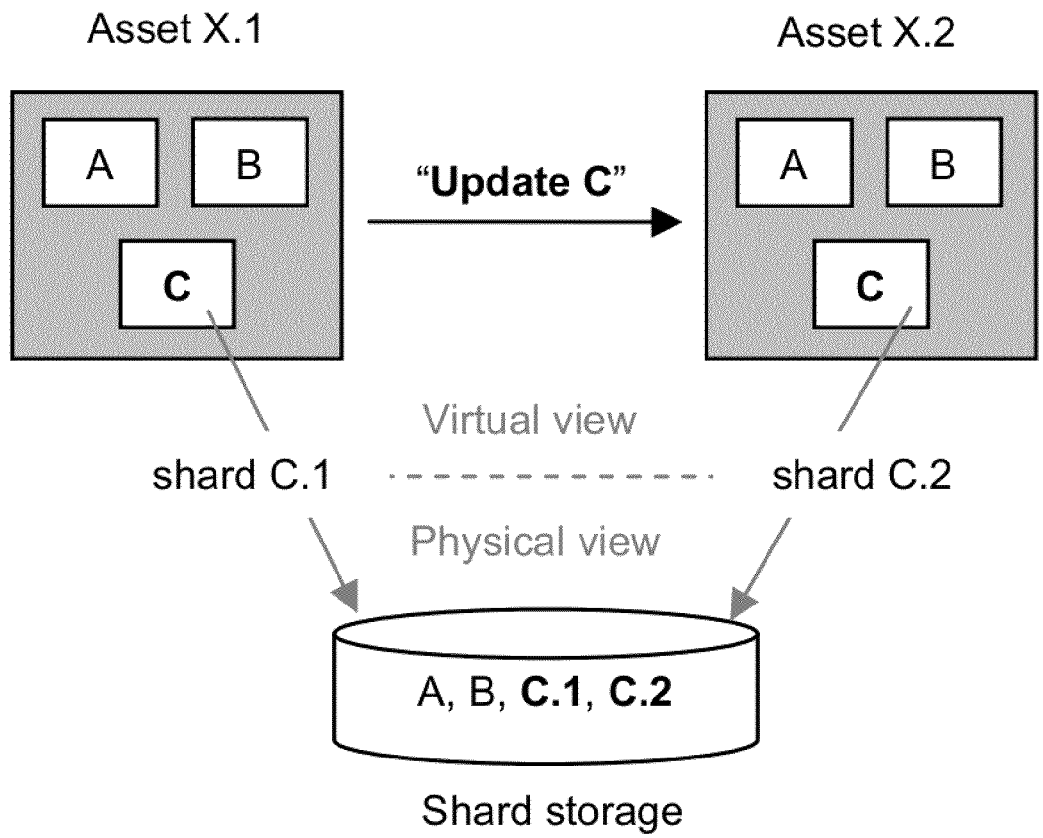
FIG. 9 is a simplified illustration of a virtual view versus a physical view of software deployment.

Referring to FIG. 8, there is shown a block diagram of a host system 800 configured to operate according to an embodiment of the present invention. For purposes of this invention, computer system 800 may represent many types of computers, information processing system or other programmable electronic device, The computer system 800 may be a stand-alone device or networked into a larger system.

The system 800 could include a number of operators and peripheral devices as shown, including a processor 802, a memory 804, and an input/output (I/O) subsystem 806. The I/O subsystem 806 may be operatively connected to an input multiplexer 840 and an output analyzer 860. The processor 802 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. RAM may be embodied in one or more memory chips. The memory may be partitioned or otherwise mapped to reflect the boundaries of the various memory sub-components.

The memory 804 represents either a random-access memory or mass storage. It can be volatile or non-volatile. The system 800 can also comprise a magnetic media mass storage device such as a hard disk drive.

The I/O subsystem 806 may comprise various end user interfaces such as a display, a keyboard, and a mouse. The I/O subsystem 806 may further comprise a connection to a network such as a local-area network (LAN) or wide-area network (WAN) such as the Internet. Processor and memory components are physically interconnected using conventional bus architecture. Also shown here is a virtual machine monitor 880 operatively connected to the processor 806.

According to an embodiment of the invention, a computer readable medium, such as a CDROM 801 can include program instructions for operating the programmable computer 800 according to the invention.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as a CDROM can include program instructions for operating the programmable computer 800 according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for updating an application on a host system, the method comprising steps of:

installing the application on the host system;

installing a virtual machine monitor on the host system;

installing a first virtual container on the host system;

providing at least one update to the installed application within the first virtual container;

using the virtual machine monitor to instantiate the first virtual container in a mode wherein the host system is accessed but not modified;

wherein instantiating the first virtual container comprises applying the at least one update to the installed application, within the first virtual container;

running the updated application in the first virtual container;

confirming that the updated application runs properly; and devirtualizing the first virtual container, wherein devirtualizing the first virtual container comprises the steps of:
copying a state of the first virtual container instantiated with at least one update to an installed application into the host machine, or designated portion thereof, the copying step comprising steps of:
examining data items in the host system, or designated portion thereof, and the first virtual container to determine any data items that exist in the host machine, or designated portion thereof, that do not exist in the first virtual container;
deleting data items that exist in the host system, or designated portion thereof, but do not exist in the first virtual container;
deleting data items of the host system, or designated portion thereof, with contents that are different from corresponding data items in the first virtual container; and
copying data items from the first virtual container that do not exist in the host system, or designated portion thereof, to the host system, or designated portion thereof.

2. The method of claim 1 wherein the step of confirming that the updated application runs properly comprises running tests from within the first virtual container.

3. The method of claim 1 further comprising steps of:
installing a second virtual container providing an additional update to the updated application; and
running the second virtual container from within the first virtual container;
wherein access to the first and second virtual containers is intermediated by an input multiplexer.

4. The method of claim 1 wherein running the updated application comprises using a copy-on-write mechanism when code in the first virtual container attempts to modify the host system.

5. The method of claim 1 further comprising:
installing a second virtual container;
wherein the first and second virtual containers contain two different updates, one update in each virtual container, wherein one of the updates contains no modifications to the installed application; and
running the updated application on the host system from within each of the virtual containers simultaneously.

6. The method of claim 5 further comprising: comparing the performance of the updated application running the two different virtual containers.

7. The method of claim 1 further comprising a step of: presenting results of the confirming step to an end user.

8. The method of claim 7 further comprising steps of: determining a monetary cost for each virtualization; and billing the end user for the cost.

9. The method of claim 1 further comprising a step of: executing a rollback by discarding a current instance of the first virtual container.

10. The method of claim 1 wherein the step of running the updated application comprises steps of: running the installed application and the updated application in tandem with input replicated between the two applications; and comparing performance of the two applications.

11. The method of claim 1 wherein the data items of the first virtual container and host system comprise one or more of the following: files, Windows registry keys, environment variable values, Jar and zip-file entries.

12. The method of claim 11 further comprising a step of: uninstalling the first virtual container from the host system.

13. The method of claim 12 further comprising a step of: uninstalling the virtual machine monitor from the host computer.

14. A system for updating an application on a host system, the system comprising:
at least one virtual machine monitor;
at least one virtual container;
at least one application installed on the host system;
at least one update to the at least one application within the at least one virtual container; and
a processor configured for:
installing the at least one application on the host system;
installing the virtual machine monitor;
installing the at least one virtual container on the host system, wherein the at least one virtual container comprises the at least one update to the at least one application;
instantiating the at least one virtual container within the virtual machine monitor in a mode wherein the host system is accessed but not modified and wherein instantiating the at least one virtual container comprises:
applying the at least one update to the at least one application within the at least one virtual container;
running the updated application in the at least one virtual container;
confirming that the updated application runs properly; and
devirtualizing the at least one virtual container, wherein devirtualizing the at least one virtual container comprises the steps of:
copying a state of the at least one virtual container instantiated with at least one update to an installed application into the host machine, or designated portion thereof, the copying step comprising steps of:
examining data items in the host system, or designated portion thereof, and the at least one virtual container to determine any data items that exist in the host machine, or designated portion thereof, that do not exist in the at least one virtual container;
deleting data items that exist in the host system, or designated portion thereof, but do not exist in the at least one virtual container;
deleting data items of the host system, or designated portion thereof, with contents that are different from corresponding data items in the at least one virtual container; and
copying data items from the at least one virtual container that do not exist in the host system, or designated portion thereof, to the host system, or designated portion thereof.

15. The system of claim 14 wherein at least one virtual container is a virtual application container.

16. The system of claim 14 further comprising, in the host system: an input multiplexer configured for mediating access to the at least one virtual container; and an output analyzer configured for confirming that the updated application performed as expected.

17. A computer program product embodied on a non-transitory computer readable storage medium and comprising code that, when executed, causes a computer to perform the following:
install an application on the host system;
install a virtual machine monitor on the host system;
install a first virtual container on the host system;
provide at least one update to the installed application within the first virtual container;
instantiate the first virtual container in a mode wherein the host system is accessed but not modified and wherein instantiating the first virtual container comprises applying the update, within the first virtual container, to the installed application, and running the updated application in the first virtual container;

confirm that the updated application runs properly; and devirtualize the first virtual container, wherein devirtualizing the first virtual container comprises the steps of:

copying a state of the first virtual container instantiated with at least one update to an installed application into the host machine, or designated portion thereof, the copying step comprising steps of:

examining data items in the host system, or designated portion thereof, and the first virtual container to determine any data items that exist in the host machine, or designated portion thereof, that do not exist in the first virtual container;

deleting data items that exist in the host system, or designated portion thereof, but do not exist in the first virtual container;

deleting data items of the host system, or designated portion thereof, with contents that are different from corresponding data items in the first virtual container; and copying data items from the first virtual container that do not exist in the host system, or designated portion thereof, to the host system, or designated portion thereof.

* * * * *